Aug. 30, 1960 W. BÜTTIKER 2,950,896
ROTARY SLIDE VALVE WITH INSPECTION STOP VALVE
Filed Aug. 31, 1954
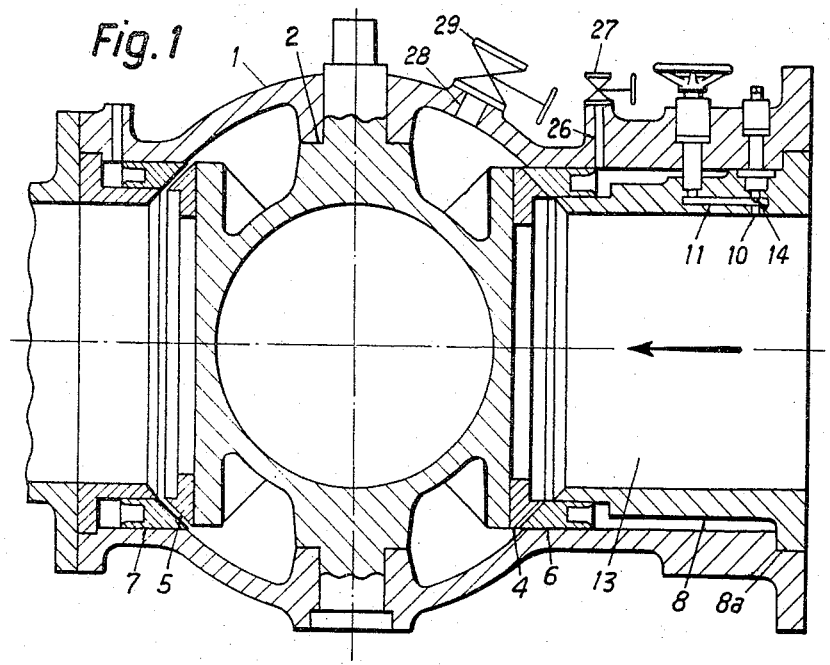
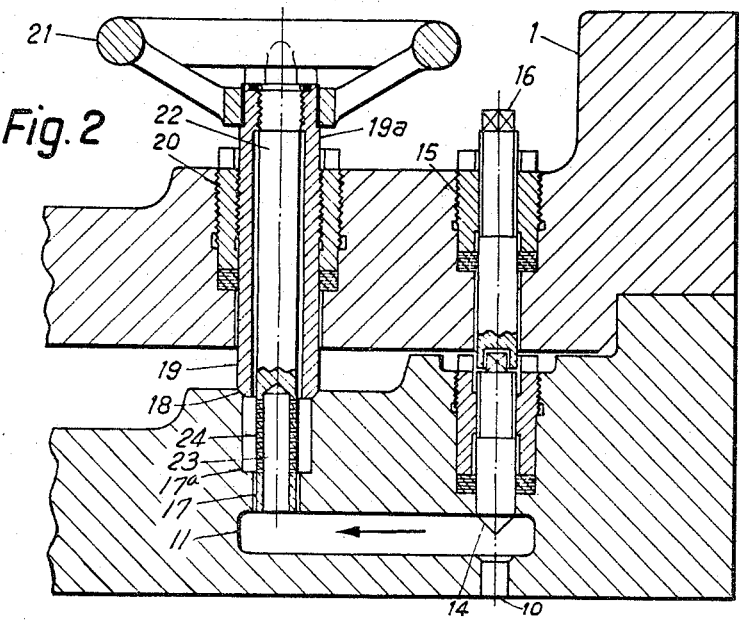
INVENTOR:
WERNER BÜTTIKER

United States Patent Office 2,950,896
Patented Aug. 30, 1960

2,950,896

ROTARY SLIDE VALVE WITH INSPECTION STOP VALVE

Werner Büttiker, Klus, near Balsthal, Switzerland, assignor to Gesellschaft der Ludw. von Roll'schen Eisenwerke A.G., Gerlafingen, Switzerland, a Swiss company Filed Aug. 31, 1954, Ser. No. 453,297

Claims priority, application Switzerland Sept. 8, 1953

1 Claim. (Cl. 251—172)

The present invention relates to a rotary slide valve with a revision stop valve. Known designs of slide valves serving as shut-off devices for water turbines and pumps have a double closing device in which a pressure liquid, usually water, forces a mobile joint or packing ring against the rotary slide valve, the packing on the outlet side serving as an operational closure and that on the inlet side as an inspection and safety stop. The main object of the inspection stop is to enable the operational or service packing to be checked or exchanged without requiring the pressure line to be emptied.

For the purpose of actuating the joint ring of the inspection stop the pressure liquid has so far been supplied from the pressure line through a line outside the unit. It is therefore possible that this line is accidentally damaged or even destroyed during inspection of the operational stop, e.g. by being hit by an object suspended from a crane or by other causes. This may cause the inspection stop to open during inspection work, which may again have very dangerous results. The invention resides in the fact that at least the pressure line or duct to the inspection stop is arranged within the slide-valve housing.

An embodiment of the invention is shown in the enclosed drawing in which

Fig. 1 is a longitudinal section of a rotary slide valve having an operational and an inspection stop, and Fig. 2 is an enlarged view of the hydraulic line leading to the inspection stop.

In the two-part housing 1 of a rotary slide valve of known construction is arranged the valve body 2 equipped with two oppositely disposed joint or packing rings 4 and 5 against which the mobile primary and secondary packing rings 6 and 7, respectively, are forced by the action of a pressure liquid. Hitherto these packing rings have been actuated by the pressure liquid supplied through lines disposed outside the unit. The stop on the inlet or upstream side of the rotary slide valve is particularly employed during inspection of the joint 7, 5 opposite, which is subjected to wear and tear. The inlet joint 6, 4 is therefore termed inspection stop. It is essential that this stop operate with perfect reliability. The pressure liquid line or duct so far arranged outside the unit, through which this stop has hitherto been actuated, does not positively prevent the stop leaking because of damage. According to the invention the pressure liquid line supplying the packing ring 6 is arranged within the housing 1 of the slide valve. The hollow ring body 8, which is held in the housing 1 and of which the annular flange 8a is clamped in the housing 1 by the connecting pipe constituting the flow line, is provided with a duct comprising a bore 10 communicating with a longitudinal bore 11. Bore 10 constitutes the upstream end of this duct and may be closed by the auxiliary valve 14 which is actuated by the member 16 arranged in a stuffing box 15 in housing 1. Bore 17 opens into the longitudinal bore 11. This bore 17 is enlarged at 17a and ends in the valve seat 18, forming the downstream end of this duct. This valve seat 18 can be closed by means of the operating valve 19 designed as a threaded bush 19a held in tight relation in the housing 1 by means of a stuffing box 20 having female and male threads. The said operating valve can be closed by rotating the hand wheel 21 arranged on the threaded bush. Into the bore of the outer valve member or stuffing box 19a is screwed a bolt or inner valve member 22 of which the lower portion is provided with a bore 23 and a filter 24. The bores 10 and 11 conduct the water from the pressure line 13 through the filter 24 directly to the rear of the inspection stop or secondary packing ring 6. The valve 14 which is serially arranged in bore 11 with respect to valve 19 normally remains open while the latter is opened to actuate the inspection stop. The valve 14 is actuated only for the purpose of inspection or of flushing the bores 10, 11 and 17, or of cleaning the filter 24. With valves 14 and 19 closed, the filter 24 may be removed for cleaning and the bores 10, 11, 17 and 17a may be flushed when the valve 14 is opened and the bolt 22 removed while valve 19 is closed. A bore 26 and a valve 27 in front of the inspection stop and a bore 28 and a valve 29 behind the said stop are provided for flushing.

The inspection stop operates as follows: When the slide valve is open, the valve 19 is closed and the valve 27 open, while valve 29 is closed. The valve 14 may be either open or closed at this time. When the slide valve is closed as shown in Fig. 1, e.g. when the operational stop is to be inspected, the valves 14 and 19 are open and valve 27 closed, while valve 29 is open.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

A rotary slide valve for controlling the flow of fluid in a flow line, comprising a housing having an inlet end and an outlet end, a main valve body rotatably disposed in said housing between said inlet and outlet ends of said housing, a primary packing ring and a secondary packing ring, each of said packing rings being disposed within said housing for reciprocable movement into sealing contact with and away from said main valve body at opposite sides thereof, said primary packing ring being located adjacent said outlet end of said housing and said secondary packing ring being a cylindrical body located adjacent said inlet end of said housing, said housing being provided with respective recesses for each of said packing rings, said packing rings projecting outwardly from and being slidably guided in said recesses, a duct disposed within said housing adjacent said inlet end thereof, said duct having an upstream end opening into the interior of said housing adapted to communicate with a flow line, said duct having further a downstream end opening into the recess guiding said secondary packing ring, an operating valve for said secondary packing ring, said operating valve being located in said housing and communicating with said duct for opening and closing said duct adjacent said downstream end thereof, an auxiliary valve for said secondary packing ring, said auxiliary valve being serially arranged in said duct with respect to said operating valve located in said housing for opening and closing said duct adjacent said upstream end thereof, means operatively connected to said operating and said auxiliary valves and extending out of said housing for actuating said valves independently of one another from without said housing, whereby for inspection and like operations of said primary packing ring said secondary packing ring may be put into operation by actuation of both said auxiliary and operating valves to open said duct and to admit said fluid from said flow line to said secondary packing ring and to press the latter into sealing contact with said main valve body thereby interrupting said flow line adjacent the inlet end of said housing, whereas upon inspection and like operations of said operating valve said auxiliary valve may be actuated to close said duct adjacent said upstream end thereof, said operating valve comprising an outer sleeve member having a valve seat surface at a first end thereof, and projecting with a second end beyond said housing, said outer sleeve member being movable within said housing between an open and a closed position, said valve seat surface cooperating with said duct and closing the latter in said closed position of said outer sleeve member, an inner member extending internally of said sleeve member and engageable with and disengageable from said sleeve member from a location exteriorly of said housing and adjacent said second end of said sleeve member, and a filter connected to said inner member and projecting into said duct, said filter being removable from said duct, independently of said sleeve member, for inspection and like purposes, upon disengagement of said inner member from said sleeve member, while said downstream end of said duct remains closed.

References Cited in the file of this patent
UNITED STATES PATENTS

| | | |
|---|---|---|
| 314,020 | Hazard | Mar. 17, 1885 |
| 712,485 | Bickford | Nov. 4, 1902 |
| 783,953 | Henry | Feb. 28, 1905 |
| 1,582,399 | Helander | Apr. 27, 1926 |
| 2,230,323 | Guyton | Feb. 4, 1941 |
| 2,258,230 | Warren | Oct. 7, 1941 |
| 2,653,004 | Schnyder | Sept. 22, 1953 |
| 2,673,708 | Danks | Mar. 30, 1954 |